United States Patent [19]

Carter et al.

[11] 4,319,643
[45] Mar. 16, 1982

[54] FRONT FOLDING AGRICULTURAL TOOL BAR WITH MOVABLE CARRIAGE TO WHICH WINGS COUPLED

[75] Inventors: Jackie L. Carter, Lucerne; Jerry D. Carter, Unionville, both of Mo.

[73] Assignee: Carmaco, Inc., Unionville, Mo.

[21] Appl. No.: 126,195

[22] Filed: Mar. 3, 1980

[51] Int. Cl.³ .............................................. A01B 73/00
[52] U.S. Cl. ................................. 172/311; 280/411 A
[58] Field of Search ..................... 172/311, 456, 662; 56/228, 385; 280/411 R, 411 A, 411 B, 411 C, 412, 413, 639, 656

[56] References Cited

U.S. PATENT DOCUMENTS

| | | | |
|---|---|---|---|
| 2,944,615 | 7/1960 | Clark | 172/456 |
| 2,958,383 | 11/1960 | Danielson | 172/456 |
| 3,491,836 | 1/1970 | Doepker | 172/311 |
| 3,698,488 | 10/1972 | Yoder et al. | 172/311 |
| 4,042,044 | 8/1977 | Honnold | 172/311 |
| 4,088,346 | 5/1978 | Schreiner et al. | 280/656 |
| 4,117,892 | 10/1978 | Dietrich, Sr. et al. | 172/311 |
| 4,137,852 | 2/1979 | Pratt | 172/311 X |
| 4,138,134 | 2/1979 | Lechler et al. | 280/411 A |

FOREIGN PATENT DOCUMENTS 2440655 3/1976 Fed. Rep. of Germany ...... 172/456

Primary Examiner—Richard T. Stouffer
Attorney, Agent, or Firm—Lowe, Kokjer, Kircher, Wharton & Bowman

[57] ABSTRACT

An agricultural tool bar having a main beam and a pair of tool supporting side wings which fold forwardly from an extended operating position to a folded transport position. The inner ends of the wings are attached to hinges which are pivoted to a carriage mounted for rolling movement along the main beam. Hydraulic cylinders pivot the hinges relative to the carriage as diagonal links cause the carriage to roll along the beam in a manner to fold and unfold the side wings. Additional hydraulic cylinders act to raise the main beam to the transport position wherein the side wings are wholly supported on the main beam which is in turn supported on a wheel assembly having a sturdy axle underlying it.

14 Claims, 7 Drawing Figures

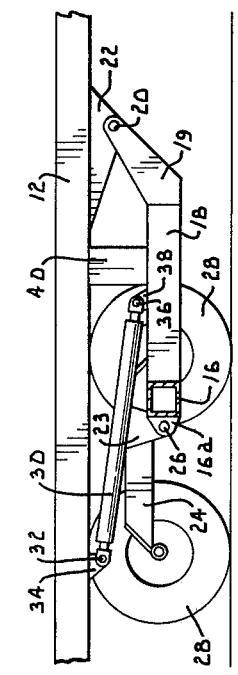

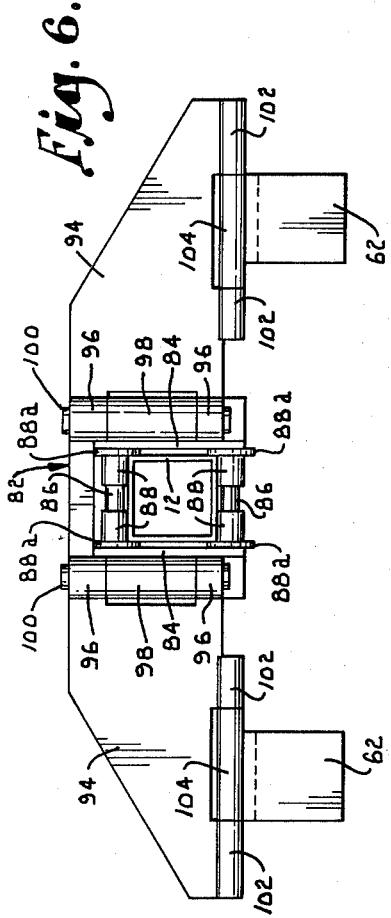
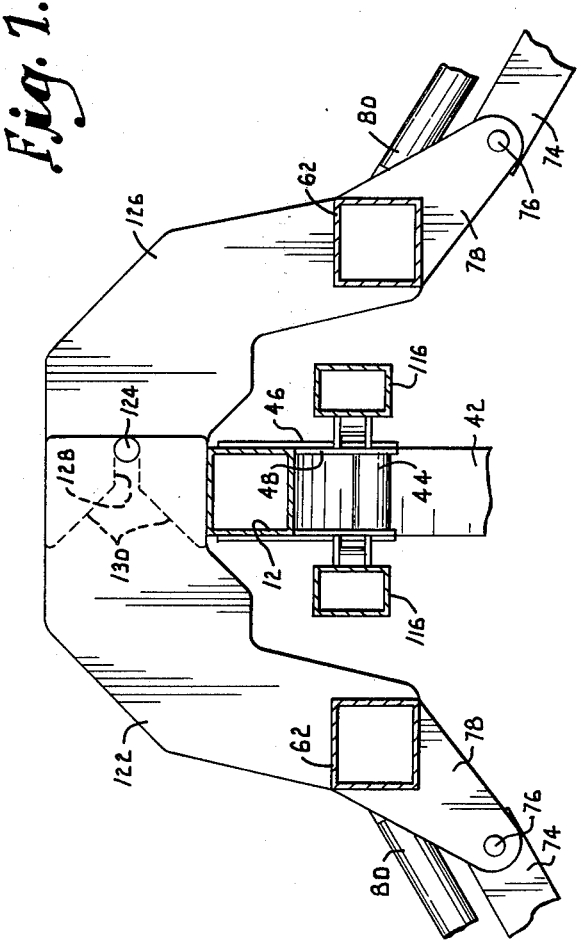
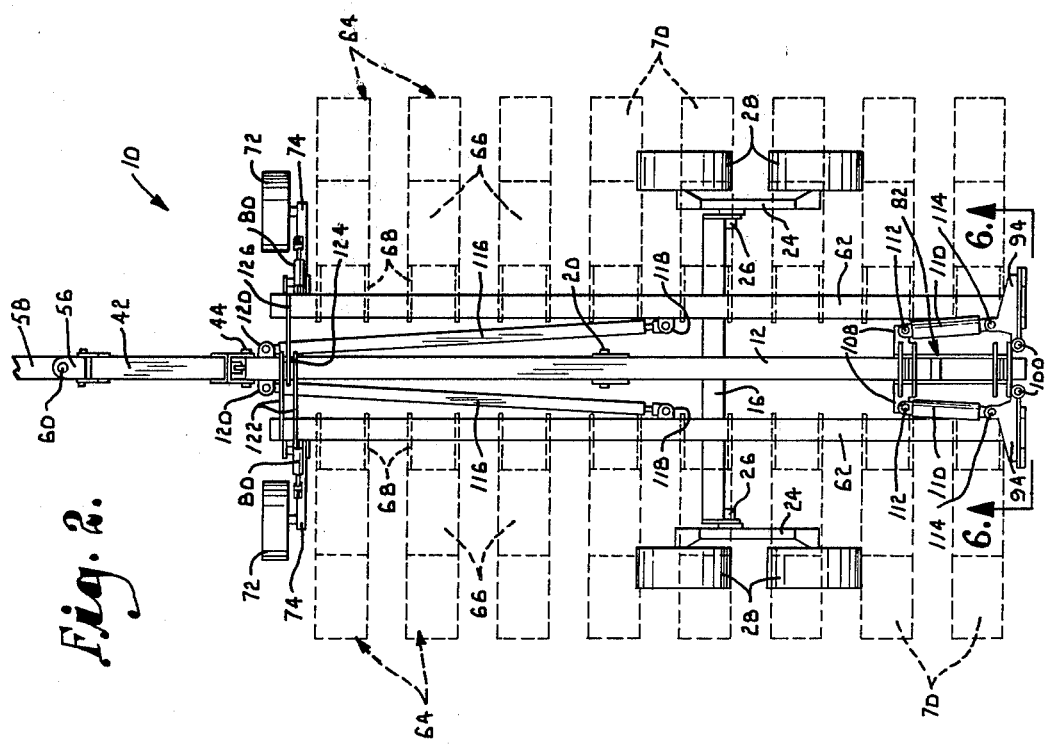

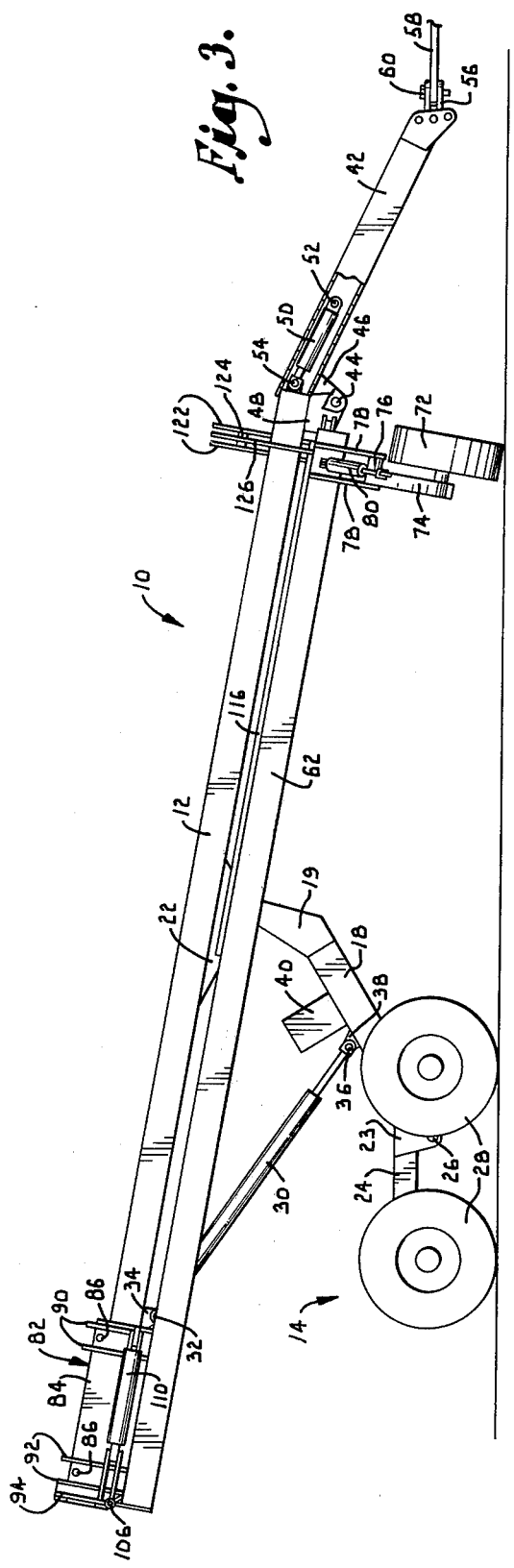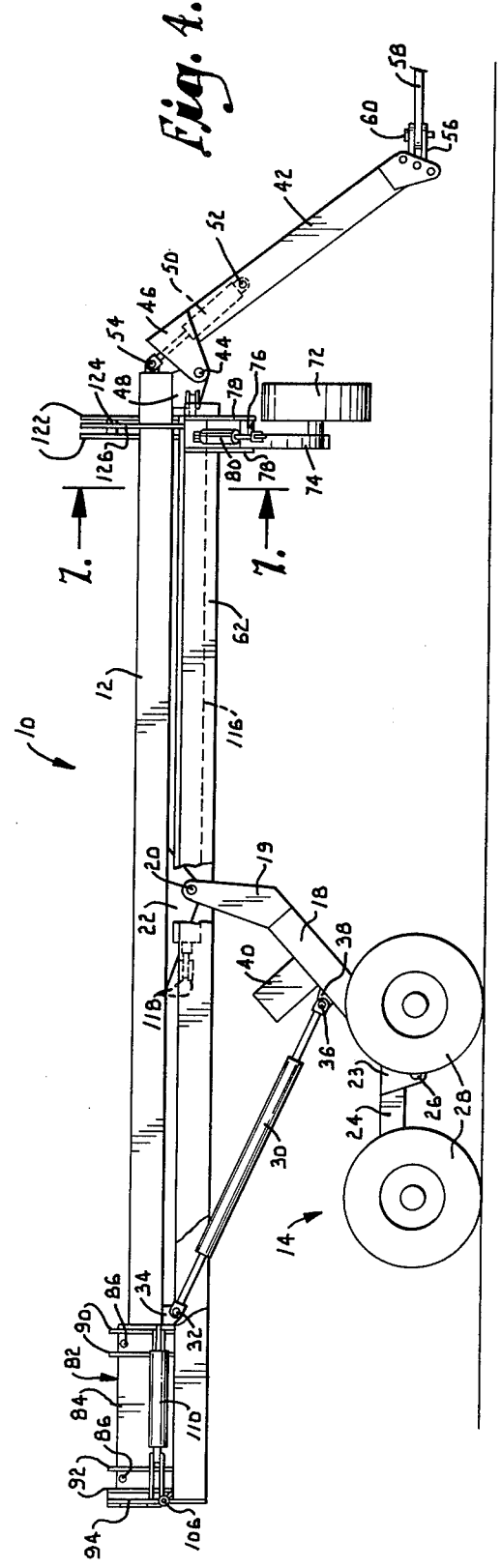

FRONT FOLDING AGRICULTURAL TOOL BAR WITH MOVABLE CARRIAGE TO WHICH WINGS COUPLED

BACKGROUND AND SUMMARY OF THE INVENTION

This invention relates generally to agricultural tool bars and deals more specifically with a tool bar having a pair of side wings which fold forwardly to a transport position.

The tool bars of planters and other agricultural implements carry devices such as planter boxes, cultivators, and other tools which are used to work the soil or otherwise treat the field. The implement is typically pulled through the field by a large tractor with the tool bar in an extended operating position wherein it is oriented traverse to the direction of travel of the tractor. It is common for the span of the tool bar to be thirty feet or more since it is desirable to cover as much surface area as possible for each pass of the implement through the field. These lengthy tool bars are usually constructed such that their two side wings can be folded inwardly for transport. In the folded or transport position, the wing sections are parallel to the direction of travel, and the width of the implement is reduced sufficiently to enable it to pass through gates and along narrow roadways. The United States patents to Stufflebeam, et al., U.S. Pat. No. 3,982,773, Kinzenbaw, U.S. Pat. No. 4,117,893 and Pratt, U.S. Pat. No. 4,137,852 exemplify the known prior art relating to tool bars having folding wing sections.

These existing tool bars have been less than satisfactory in a number of respects. The folding mechanisms are characterized by undue complexity which increases the cost and maintenance problems and reduces the reliability of the implement. Manual operations such as unlatching or unpinning the components by hand are often required before the tool bar can be folded or unfolded. The use of caster wheels in these units increases the instability and the safety problems, particularly when furrow openers, minimum tillage coulters or fertilizer openers are used. Existing implements of this type are also characterized by lack of sufficient ground clearance in the transport position and by excessive overall height which decreases their stability and presents additional problems when power lines and other overhead obstacles are encountered. Moreover, the lack of sufficient flexibility in the wing sections causes problems such as lack of uniformity in seed depth during travel over rolling ground and other uneven terrain.

Another undesirable aspect of existing tool bars is their tendency to apply a disproportionate share of the load on the tractor. This increases the strain on the tractor and adds to its power requirements while making it difficult if not impossible to travel through muddy fields. A further shortcoming is caused by the need for the wing support wheels to provide support in the transport position. These wheels are better suited to cooperate with one another in supporting the wings during travel in the extended operating position, and they must be specially constructed if they are to serve also as support wheels during transport. Lengthy extension of the tool bar to the rear in the transport position is also undesirable because it hampers the maneuverability of the unit and increases the safety and stability problems.

Tool bars which employ the draft arms of a three point tractor hitch are limited in the height to which they can be lifted due to limitations in the lifting capability of the draft arms. Consequently, insufficient clearance above the ground sometimes causes problems in the transport position. Also, the three point tractor hitch is unable to adequately hold the implement down and it can sometimes lift up at an inopportune time.

In view of these and other problems, it is apparent that there is a need for an improved folding tool bar for agricultural implements. It is the principal goal of the present invention to meet that need.

More specifically, it is an object of the invention to provide a folding tool bar which is highly stable in both the folded transport position and in the extended operating position. In this regard, it is important to note that caster wheels and the instability problems associated therewith are avoided.

Another object of the invention is to provide, in a tool bar of the character described, a sturdy axle structure which is substantially centered beneath the folded wing sections in the transport position to reduce the load on the tractor. As a result, muddy ground can be traversed and the tractor can easily pull the implement over even the roughest terrain.

Still another object of the invention is to provide a tool bar of the character described which is maintained well above the ground in the transport position and yet presents a low profile.

A further object of the invention is to provide a tool bar of the character described having a sturdy main beam which wholly supports the wing sections in the transport position of the implement. Accordingly, the wheels of the wing sections need not be specially constructed since they serve only to provide support in the extended operating position of the tool bar.

An additional object to the invention is to provide a tool bar of the character described in which the opposed wing sections have sufficient flexibility to compensate for hilly ground and other uneven field conditions. The seed depth is thus uniform even when planting is carried out on sloping or uneven field contours.

Yet another object of the invention is to provide a tool bar of the character described which is adapted for connection to a standard draw bar and which includes a simple yet reliable mechanism for raising the wing sections off of the ground and for folding and unfolding them. It is a significant feature of the invention that all operations, including folding and unfolding of the tool bar, can be accomplished from the operator's seat of the tractor.

A still further object of the invention is to provide a tool bar of the character described which is simple and economical to construct and operate and which folds forwardly to avoid extending unduly to the rear in its transport position.

Other and further objects of the invention together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a top plan view of an agricultural tool bar constructed according to a preferred embodiment of the present invention, with the wing sections of the tool bar in the extended operating position and planter units which may be carried by the tool bar shown in broken lines;

FIG. 2 is a top plan view of the tool bar shown in FIG. 1, with the wing sections folded to the transport position and the planter units shown in broken lines;

FIG. 3 is a side elevational view of the tool bar, with the wing sections folded to the transport position and the back end of the frame in the raised position, the planter units being omitted for simplicity;

FIG. 4 is a side elevational view similar to FIG. 3, but with the front end of the frame in the raised position;

FIG. 5 is a fragmentary view taken generally along line 5—5 of FIG. 1 in the direction of the arrows, with the tool bar frame in its lowered position;

FIG. 6 is a fragmentary end elevational view on an enlarged scale taken generally along line 6—6 of FIG. 2 in the direction of the arrows; and FIG. 7 is a fragmentary sectional view on an enlarged scale taken generally along line 7—7 of FIG. 4 in the direction of the arrows.

DETAILED DESCRIPTION OF THE INVENTION

Referring now to the drawings in detail, reference numeral 10 generally designates a front folding agricultural tool bar constructed in accordance with a preferred embodiment of the present invention. The frame of the tool bar 10 includes a main beam 12 which is supported on a grounded gauging wheel assembly generally designated by numeral 14. The wheel assembly 14 includes a beam-like axle 16 which connects at its center with a lift arm 18. As shown in FIGS. 3-5, the opposite or upper end of arm 18 carries a clevis 19 which is pivoted at 20 to a pair of gusset plates 22 secured to beam 12 near the center thereof. The opposite ends of axle 16 carry small end plates 16a which are pivoted to gussets 23 projecting from a pair of short horizontal beams 24. Pivot couplings 26 connect plates 16a to gussets 23. Each of the beams 24 carries a pair of wheels 28 at its opposite ends.

With particular reference to FIGS. 3-5, the back end of beam 12 and the components carried thereon may be raised and lowered relative to wheel assembly 14 by a hydraulic cylinder 30. The cylinder is double acting and includes a pair of piston rods, one of which is pivoted at 32 to an ear 34 which is secured to beam 12 at a location to the rear of axle 16. The other piston rod is pivoted at 36 to an ear 38 which is secured to lift arm 18 at a location offset from axle 16. Extension of the rods of cylinder 30 raises the back end of beam 12 from the position shown in FIG. 5 to that shown in FIG. 3, while retraction of the cylinder lowers the back end of the beam to the FIG. 5 position. In the lower position, beam 12 rests partially on a block 40 which is mounted on arm 18.

The forward end of beam 12 is pivoted to a tongue 42 by a pivot pin 44. Pin 44 pivotally connects a clevis 46 carried on tongue 42 to a pair of plates 48 projecting downwardly from the front end of beam 12. A hydraulic cylinder 50 is mounted within tongue 42 and is pivoted thereto at its base end by a pivot pin 52. The opposite or rod end of cylinder 50 is pivoted at 54 to the front end of beam 12 at a location above pivot pin 44.

A clevis hitch 56 is pivotally carried on the forward end of tongue 42. The clevis is adapted to receive a standard draw bar 58 of the type which extends from a conventional tractor (not shown) used to pull the tool bar. A hitch pin 60 may be used to pivotally connect the draw bar with clevis 56. Extension of cylinder 50 causes the forward end of beam 12 to raise from the FIG. 3 position to the FIG. 4 position, while retraction of cylinder 50 lowers the main beam 12 to the position of FIG. 3.

The tool bar 10 includes a pair of opposed wing sections 62 which are located on opposite sides of the main beam 12. The two wing sections 62 are constructed identically, and each serves as a tool support beam which carries a plurality of tools or other devices such as the conventional planter units 64 shown in broken lines in FIGS. 1 and 2. The planter units are commercially available devices, and each includes a seed box 66 which is mounted to its wing section 62 by a linkage 68 which is arranged to permit the planter unit to accomodate itself to variations in the contour of the field. A packing wheel 70 trails each seed box 66 in order to bury the seed which is planted by the planter mechanism.

The outer end of each wing section 62 carries a wheel 72 which assists in supporting the tool bar in the extended operating position thereof. Each wheel 72 is carried on the lower end of a support leg 74 having its upper end pivoted at 76 between a pair of bracket plates 78 extending from the wing 62. A hydraulic cylinder 80 is mounted between each wing section 62 and the associated leg 74 such that extension of the cylinder causes raising of the wing section 62 relative to the ground engaging wheel 72. The outer end of each wing section 62 is equipped with a conventional row marker (not shown) which is omitted from the drawings since it forms no part of the present invention.

Reference numeral 82 generally designates a carriage which is mounted on main beam 12 for movement along the length thereof. Carriage 82 includes a pair of opposed side plates 84 which are located on opposite sides of beam 12. Extending between plates 84 are a plurality of pins 86 which are located near the front and back ends of the carriage above and below beam 12. Each pin 86 receives a pair of rollers 88 (FIG. 6) engaging the upper and lower surfaces of beam 12. Each roller 88 has an enlarged flange 88a on its outer end to properly maintain the rollers on beam 12. In this manner, carriage 82 is mounted to roll back and forth along beam 12. A pair of forward ribs 90 and a pair of rearward ribs 92 extend between side plates 84 to strengthen the construction of the carriage.

A pair of hinges 94 are pivotally mounted to the opposite sides of carriage 82. As best shown in FIG. 6, each hinge 94 carries a pair of vertically spaced sleeves 96 which are fitted above and below a hinge barrel 98 secured to one of the ribs 92. A vertical hinge pin 100 is inserted through each barrel 98 and the corresponding sleeves 96 in order to mount hinges 94 on opposite sides of carriage 82 for movement about the substantially vertical pivot axes defined by the hinge pins 100.

The inner ends of wing sections 62 are pivotally connected with the respective hinges 94. Each hinge 94 includes a pair of spaced apart sleeves 102 which are located on opposite sides of a hinge barrel 104 secured to the inner end of the corresponding wing section 62. A hinge pin 106 (see FIGS. 3 and 4) is fitted through each barrel 104 and the corresponding pair of sleeves 102 in order to mount the wing sections to hinges 94 for movement about the horizontal pivot axes defined by pins 106.

As best shown in FIGS. 1 and 2, the forward end of carriage 82 includes a pair of lugs 108 which project outwardly on opposite sides of beam 12. A pair of hydraulic cylinders 110 are pivoted at their base ends to the respective lugs 108 by pivot couplings 112. The rod ends of cylinders 110 are pivoted at 114 to the respective hinges 94. The pivot couplings 114 are offset from hinge pins 100 such that extension and retraction of cylinders 110 tends to pivot hinges 94 about pins 100.

Each wing section 62 has a rigid link 116 which is pivoted at its outer end between a pair of ears 118 secured to an intermediate portion of the wing section. Links 116 angle inwardly and forwardly from ears 118, and each link is pivoted at its inner or forward end between a pair of ears 120 projecting from beam 12 near the forward end thereof.

The wing section 62 which is on the left side of beam 12 as viewed in FIG. 1 carries on its outer end a hanger in the form of a pair of spaced apart plates 122. Extending between forward portions of plates 122 is a short pin 124. The outer end of the other wing section 62 is equipped with a hanger in the form of a single plate 126. The forward end of plate 126 presents a notch 128 (FIG. 7) which is adapted to closely receive pin 124. Notch 128 has a gradually tapered mouth portion presenting inclined sides 130 which gradually angle inwardly from the edge of plate 126 to the notch 128.

In use, the tool bar 10 is normally pulled through a field in the extended operating position shown in FIG. 1. The draw bar 58 of the tractor is connected with clevis 56 by pin 60, and beam 12 may then be pulled through the field in the lowered position of the beam shown in FIG. 5. Wing sections 62 extend outwardly from the main beam 12 at a right angle relative thereto, and the planting mechanisms associated with planter units 64 act to plant rows of seed in the field. The ability of wing sections 62 to pivot about the horizontal hinge pins 106 permits uneven terrain to be planted with uniformly accurate seed depth. It is emphasized, however, that tools other than the planter units 64 may be carried on the wing sections 62 of the tool bar.

When the tool bar is to be transported, wing sections 62 are folded inwardly and forwardly to the transport positions shown in FIG. 2. This is accomplished by initially activating cylinders 80 to raise the outer ends of wing sections 62 and by extending cylinder 30 to raise the back end of beam 12 to the position shown in FIG. 3. The planter units 64 or the other tools carried on the wing sections are thereby raised above the ground while wheels 72 remain on the ground to support the outer ends of the wing sections.

Cylinders 110 are then retracted to effect folding movement of the wing sections to the transport position. Retraction of the cylinders from the position shown in FIG. 1 tends to pivot hinges 94 forwardly about the vertical hinge pins 100. This pivotal movement of the hinges is translated to the wing sections 62 which likewise tend to pivot forwardly. However, links 116 restrict forward pivoting of the wing sections, causing the carriage 82 to roll rearwardly on main beam 12. The wing sections 62 continue to pivot inwardly and forwardly in an arc until carriage 82 has reached the back end of beam 12. At this point, wing sections 62 are folded completely inwardly, and hanger plate 126 is received between the hanger plates 123 of the opposite wing section. As shown in FIG. 7, the hanger plates 122 and 126 rest directly on top of main beam 12, and pin 124 is received in notch 128 to assure proper positioning of the hangers.

As wing sections 62 are folded inwardly and forwardly, wheels 72 remain on the ground to assist in supporting them. Since the back end of beam 12 is maintained in the raised position, the planter units 64 are able to clear the wheels 28 of wheel assembly 14. After the wing sections have been completely folded to the position shown in FIG. 3, cylinder 50 is activated to extend its rod and thereby lift the forward end of beam 12 from the FIG. 3 position to the FIG. 4 position. Since the hanger plates 122 and 126 rest on top of beam 12, the forward ends of the wing sections are raised with the main beam, and the wing sections are thereafter wholly supported on the sturdy main beam 12. The tool bar may then be towed by the tractor between fields or between desired locations.

The wheel assembly 14 and the sturdy, beam-like axle 16 are substantially centered beneath the main beam 12 and the folded wing sections 62. Consequently, wheel assembly 14 supports the weight of the tool bar and reduces the load on the tractor. It is also pointed out that wheels 72 are raised well above the ground and need not provide any support in the transport position of the tool bar. Wheels 72 are of the fixed type rather than being caster wheels which can lead to instability and related safety problems.

In the transport position, wing sections 62 are located along side the main beam 12 and are parallel thereto to minimize the width of the folded unit. Carriage 82 is located at the back end of main beam 12, and the forwardly folding movement of wing sections 62 assures that they do not extend rearwardly beyond the end of the beam. The latching effect provided by the close fit of pin 124 in notch 128 holds the forward ends of wing sections 62 together in the transport position and does not require any manual operations for release of the latch. Beam 12 and the components it carries are raised well above the ground to provide adequate ground clearance in the transport position.

Unfolding of the wing sections from the transport position to the extended operating position is accomplished by initially retracting cylinder 50 to lower wheels 72 to the position of FIG. 3. Cylinders 110 are then extended thereby tending to pivot hinges 94 rearwardly about pins 100. The resultant tendency for wing sections 62 to pivot outwardly is resisted by links 116, and carriage 82 is caused to roll forwardly on beam 12. The wing sections continue to pivot outwardly and rearwardly in an arc until they reach the fully extended position shown in FIG. 1. Cylinder 30 is then retracted to lower the back end of beam 12 to the operating position.

It is contemplated that means other than cylinders 110 may be used to effect folding and unfolding movement of the wing sections. For example, the main beam 12 may be provided with a rack which mates with a power driven pinion carried on carriage 82 in a manner to move the carriage back and forth along the main beam upon rotation of the pinion. The carriage can also be pulled back and forth along the beam by a cable arrangement or some other type of power driven mechanism. Alternatively, power cylinders each having one end connected with the wing section and the opposite end connected with the corresponding link 116 may be utilized for folding and unfolding the wing sections.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, we claim:

1. A forward folding agricultural tool bar comprising:
   a main beam adapted to be pulled by a traction vehicle;
   a wheel assembly supporting said main beam above the ground;
   a carriage mounted to said main beam for movement thereon lengthwise of the beam;
   a pair of tool supporting wing sections each having an outer end and an inner end coupled with said carriage for pivotal movement about a generally vertical pivot axis, each wing section having an extended position wherein the wing section is oriented to extend generally laterally from the main beam and a folded transport position wherein the wing section is oriented generally parallel to the main beam with said outer end located forwardly of said inner end;
   power means for effecting forward and rearward movement of said carriage along the main beam to carry the inner ends of said wing sections along the beam; and
   linkage means for effecting pivotal movement of each wing section about its pivot axis from the extended position to the folded positions in response to rearward movement of said carriage along the main beam and from the folded position to the extended position in response to forward movement of said carriage along the main beam whereby movement of the carriage along the beam effects movement of said wing sections between the extended and folded positions.

2. A tool bar as set forth in claim 1, wherein said linkage means includes a pair of rigid links each having one end pivotally coupled with the corresponding wing section and an opposite end pivotally coupled with said main beam at a location forwardly of said carriage.

3. A tool bar as set forth in claim 1, including:
   a pair of hinge elements coupled with the inner ends of the respective wing sections in a manner permitting pivotal movement of the wing sections about generally horizontal pivot axes; and
   means pivotally connecting each hinge element to said carriage to thereby establish said vertical pivot axes for the wing sections.

4. A tool bar as set forth in claim 3, wherein said power means comprises a pair of power cylinders pivoted to the respective hinge elements at one end and to said carriage at the opposite end, whereby extension and retraction of said cylinders acts to pivot said hinge elements about said vertical pivot axes.

5. A tool bar as set forth in claim 1, wherein said wheel assembly includes:
   an axle located beneath an intermediate portion of said main beam and oriented substantially perpendicular thereto, said beam being supported on said axle; and
   a pair of ground engaging wheels carried on opposite ends of said axle.

6. A tool bar as set forth in claim 1, including additional power means for raising said main beam relative to said wheel assembly.

7. A tool bar as set forth in claim 1, including:
   a ground engaging wheel on the outer end of each wing section to support the outer end portion of the wing section above the ground in the extended position thereof; and
   means for maintaining a rearward end portion of said main beam in a raised position relative to said wheel assembly during pivotal movement of the wing sections between the extended and folded positions, thereby to provide clearance of the wing sections above said wheel assembly.

8. A tool bar as set forth in claim 7, including:
   means for supporting said outer ends of the wing sections on said main beam in the folded position of the wing sections; and
   power means for raising a forward end portion of said main beam relative to said wheel assembly in the folded position of the wing sections, thereby raising the outer end portions of the wing sections to raise said wheels of the wing sections above the ground, said wing sections being supported entirely on said main beam in the folded position.

9. A forwardly folding agricultural tool bar comprising:
   a main beam adapted to be pulled by a traction vehicle;
   an axle underlying an intermediate portion of said main beam to assist in supporting the main beam above the ground during travel thereof;
   a pair of ground engaging wheel assemblies carried on said axle on opposite sides of said main beam;
   a pair of opposed tool supporting wing sections each having an outer end carrying a wheel for supporting the wing section in an extended position wherein the wing section extends outwardly from the main beam generally perpendicular thereto;
   a carriage mounted on said main beam for movement thereon lengthwise of the beam;
   means coupling an inner end of each wing section with said carriage in a manner permitting generally forward folding movement of the wing section from its extended position to a folded position wherein the wing section extends along side the main beam and is wholly supported thereon with the outer end of the wing section located forwardly of the inner end thereof;
   linkage means effecting folding movement of said wing sections between the extended and folded positions in response to movement of said carriage in opposite directions along said main beam;
   power means for effecting movement of said carriage in opposite directions along said main beam; and
   means for raising said main beam relative to said axle to raise said wheels of the wing sections off of the ground, whereby said wing sections are wholly supported on the main beam in said folded position.

10. A tool bar as set forth in claim 9, wherein said raising means includes a first power element operable to raise a rearward end of said main beam relative to said axle and to maintain said rearward end in a raised position during movement of the wing sections between the extended and folded positions, whereby said wheels of the wing sections travel along the ground and said wing sections pass above said ground engaging wheel assemblies during movement of the wing sections between the extended and folded positions.

11. A tool bar as set forth in claim 10, wherein said raising means includes a second power element operable to raise a forward end of said main beam relative to said axle when the wing sections are in the folded position.

12. A tool bar as set forth in claim 9, wherein said carriage is located adjacent the rearward end of said main beam in the folded position of said wing sections.

13. An agricultural tool bar comprising:
a main beam adapted to be pulled by a traction vehicle;
a wheel assembly connected with said main beam and underlying same to support the beam above the ground;
a carriage mounted to said main beam for movement thereon lengthwise of the beam;
a pair of tool supporting wing sections each having one end portion coupled with said carriage for pivotal movement about a generally vertical pivot axis between an extended position wherein the wing section extends laterally from said main beam and a folded transport position wherein the wing section extends alongside and parallel to said main beam;
a ground engaging wheel on each wing section outboard of said pivot axis for supporting the wing section in the extended position and during movement between the extended and transport positions;
means for raising said main beam relative to said wheel assembly and holding said main beam in a raised position during movement of said wing sections between the extended and transport positions to permit the tools on said wing section to pass above said wheel assembly;
linkage means for effecting pivotal movement of each wing section about its pivot axis between the extended and transport positions in response to movement of said carriage along said main beam in opposite directions;
power means for effecting movement of said carriage along said main beam in opposite directions;
hanger means on an opposite end portion of each wing section for suspending the wing section on a preselected portion of said main beam in the transport position of the wing section; and
power means for raising said preselected portion of the main beam after both wing sections have assumed the transport position, thereby raising said ground engaging wheels above the ground to support the wing sections wholly on said main beam.

14. An agricultural tool bar comprising:
a main beam adapted to be pulled by a traction vehicle;
a wheel assembly supporting said main beam above the ground;
a carriage mounted to said main beam for movement thereon lengthwise of the beam;
a pair of tool supporting wing sections each having one end coupled with said carriage for pivotal movement between an extended position wherein the wing section extends laterally from said main beam and a folded transport position wherein the wing section is oriented generally parallel to and alongside the main beam;
a link for each wing section pivotally connected with said beam at one end and with the corresponding wing section at the opposite end in a manner to effect pivotal movement of the wing section toward the extended position in response to movement of said carriage toward said one end of the link and toward the transport position in response to movement of said carriage away from said one end of the link; and
power means for effecting movement of said carriage along said main beam in opposite directions.

* * * * *